Dec. 30, 1941.                G. W. PURDY                2,267,802
COUPLING
Filed Nov. 9, 1940

GEORGE W. PURDY
INVENTOR

BY
Robert C. Rasche
ATTORNEY

Patented Dec. 30, 1941

2,267,802

UNITED STATES PATENT OFFICE 2,267,802

COUPLING

George W. Purdy, Laurelton, N. Y.

Application November 9, 1940, Serial No. 364,988

7 Claims. (Cl. 287—103)

This invention relates to separable joints or couplings adaptable to sundry uses such as the joining of rods, cables or fixtures, etc.

An object of the invention is to provide a simple and dependable coupling which is self-locking to secure the coupled elements and may be instantly uncoupled by a simple manipulation.

Another object is to provide a separable telescoping connection, the coupling and locking of which is effected by merely pressing the separable coupling elements together in aligned relation.

In the drawing—

Figure 1:
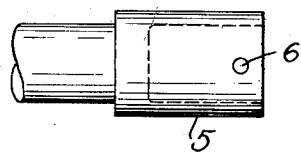
Figures 1 and 2 are side elevational views of the two complemental coupling elements.

The coupling element in Figure 1 comprises a cylindrical socket 5 at the end of the element, having a pin 6 disposed transversely or diametrically therethrough.

Figure 2:
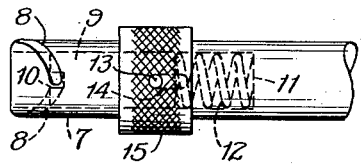
Figure 3:
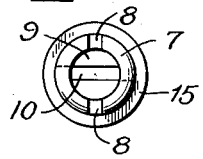
Figure 3 is an end view of the coupling element shown in Figure 2.
Figure 4:
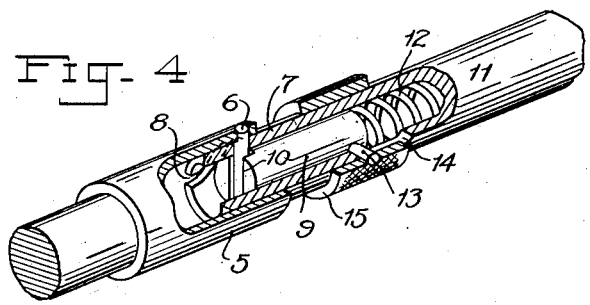
Figure 4 is a perspective view of the coupling with the elements in coupled and locked relation, a portion being broken away to facilitate illustration, and, Figure 5 is a side elevational view partly broken away in central section, illustrating a modified form of the coupling device.

The male coupling element shown in Figure 2 comprises a tubular end portion 7 bevelled or rounded at its end for easy insertion into the socket 5 and fitting snugly therein. The wall of the end portion 7 is provided with two diametrically opposed slots 8 opening at the tube end, each slot issuing from its opening in a generally spiral direction, that is, both axially and around the tube. It is desired to so arrange the slots 8 that, as the two coupling elements, Figures 1 and 2, are brought together, the pin 6 will enter the slots in a substantially axial direction and then revolve about the coupling axis to seat in the bottom of each slot. To counteract forces tending to separate the coupling elements, the slot 8 adjacent its bottom or inner end is directed substantially at right angles to the longitudinal axis of the coupling. The intermediate portion of each slot is preferably inclined from the coupling axis so that the required turning of the pin, when coupling the two elements, will be effected by merely pressing the coupling elements together endwise.

A locking device is provided which cooperates with the pin 6 to releasably hold same non-rotative in the coupled condition. This locking device comprises a cylindrical plunger 9 endwise slidable in the tubular portion 7 and having a groove 10 in its end face. The interior of the tubular end portion 7 terminates at the inner end 11 against which a spring 12 seats and engages the locking plunger 9 to urge same toward the open end of the coupling. A rod 13 projecting from the plunger 9 passes through slots 14 in the tube wall and is secured to a sleeve 15 embracing the coupling and constituting means by which the plunger 9 may be manually retracted against the force of the spring 12 during the uncoupling operation.

It will be seen that the rod 13 riding in the slot 14 prevents rotation of the plunger 9. It will be noted that the groove 10 is aligned with the bottom of each slot 8 so that when the pin 6 is in coupled position at the bottom of the slots, said pin is also seated in the groove 10.

As the elements are pressed into coupling relation, the pin 6 passing along the slots 8 comes into engagement with the end face of the plunger 9 and thus retracts the plunger while the pin 6 proceeds along the slots to the slot bottom. As afore-indicated, the spiral direction of the slots causes a relative rotation of the two coupling elements, the pin 6 revolving on the coupling axis. As the pin 6 seats in the bottom of the slots 8, the pin becomes aligned with the plunger groove 10 and the plunger 9 thus snaps into locking position, with the groove 10 embracing the pin. The pin 6 is thus locked against rotation and is therefore retained in the bottom of the slots 8, thus maintaining the elements in locked coupling relation.

When uncoupling is desired, the locking plunger 9 is retracted to free the pin 6 by drawing the sleeve 15 backward on the coupling, after which the pin is free to move out of the slots 8 when separating the coupling elements.

Figure 5:
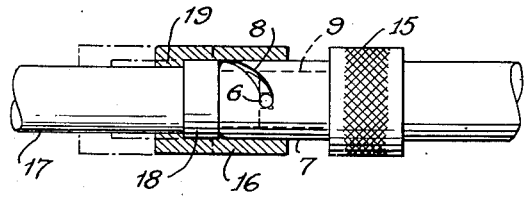

The modified form of coupling illustrated in Figure 5 embodies all of the features of the first form, and in addition provides a coupling in which the two coupled elements may have a fixed relation with each other and may nevertheless be uncoupled without requiring endwise relative movement of the coupled elements. The male coupling element is identical to that shown in Figure 2. The female coupling element, however, has a socket 16 which is endwise slidable on an element 17 during uncoupling. The element 17 has an enlarged portion or head 18 forming a shoulder against which an inwardly extending flange 19 of the socket 16 engages in the coupled condition of the device. When uncoupling is desired, the plunger 9 is retracted to release the pin 6 and the socket 16 is thus free to be rotated and move endwise on the element 17 to withdraw the pin 6 from the slots 8, while the two coupled elements remain in fixed relation. In coupled condition, the head 18 is snugly engaged between the flange 19 and the male coupling end, thus securing the socket 16 against endwise movement on the element 17.

Having now made certain the nature and purposes of my invention, and at least two modes of executing same, in such manner as to enable anyone skilled in the art to which it appertains, to make and use same, as required by the statutes, that which I claim as my property, and desire to secure by Letters Patent of the United States, is:

1. In a coupling device, the combination with two members adapted for telescopic engagement, one of said members having an internally located transverse pin, the other said member having an open ended slot adapted to receive said pin, the slot being directed angularly from the coupling axis to hold said pin against movement endwise of the coupling and requiring relative rotation of said two members in coupling, of means carried internally in the slotted member and associated with said slotted member to releasably lock said pin, and to hold said members against relative rotation.

2. In a coupling device, the combination with two members adapted for telescopic engagement, one of said members having a transverse pin, the other said member having an open ended slot adapted to receive said pin, the slot being directed angularly from the coupling axis to hold said pin against movement endwise of the coupling and requiring relative rotation of said two members in coupling, of a locking element carried internally in the slotted member and internally endwise slidable in said slotted member and having portions engageable with said pin in the coupled condition of said device, to lock said two members against relative rotation.

3. In a coupling device, the combination with two members adapted for telescopic engagement, one of said members having a transverse pin, the other said member having an open ended slot adapted to receive said pin, the slot being directed angularly from the coupling axis to hold said pin against movement endwise of the coupling and requiring relative rotation of said two members in coupling, of a locking element endwise slidable on said slotted member, having an internally located channel thereon aligned with the inner end of the slot and adapted to receive said pin in the coupled condition of said device, to lock said two members against relative rotation.

4. A self-locking coupling device comprising, in combination, two members adapted for telescopic engagement, one of said members having an internally transverse pin, the other said member having an open ended slot adapted to receive said pin, the slot being directed angularly from the coupling axis to hold said pin against movement endwise of the coupling and requiring relative rotation of said two members in coupling, a locking element internally endwise slidable on said slotted member and having a groove aligned with the inner end of the slot, adapted to receive said pin in the coupled condition of said device, to lock said two members against relative rotation, and an internal spring yieldably holding said locking element in pin-engaging position, said locking element being internally retractable by engagement of said pin therewith in the coupling of said two members.

5. A self-locking coupling device comprising, in combination, a member having a socket and a pin therein, a tubular coupler member insertable in said socket and having slots opening at the coupler end to receive said pin, the slots being each directed angularly from the coupler axis to hold said pin against movement endwise of the coupler, requiring relative rotation of said two members in coupling, and a spring-pressed locking plunger slidable within said tubular member and having a groove aligned with the inner ends of the coupler slots and adapted to receive said pin in the coupled condition of said device, to lock said socketed member and said tubular member against relative rotation.

6. In a coupling device, in combination, a first member having a socketed element endwise slidable thereon, with a pin disposed transversely in the socket, a second member insertable in said socketed element and having an open-ended slot adapted to receive said pin, the slot being directed angularly from the coupling axis to hold said pin against movement endwise of the coupling and requiring relative rotation of said socketed element and said second member in coupling, and a spring-pressed locking plunger slidable and non-rotative on said second member and having a transverse groove adapted to receive said pin in the coupled condition of said device, to lock said socketed element and said second member against relative rotation.

7. In a connection, a first member having a sleeve element endwise movable thereon, an internally located detent member in the sleeve element, a second member insertable in said sleeve element and having an open-ended helical slot adapted to receive said detent, and an internally located automatically-pressed locking member movable and non-rotative on said second member and having a groove adapted to receive said detent in the coupled condition of the device to lock said sleeve element and said second member against relative rotation.

GEORGE W. PURDY.